(12) United States Patent
Yamada et al.

(10) Patent No.: US 11,124,135 B2
(45) Date of Patent: Sep. 21, 2021

(54) VEHICLE FRONT-PART STRUCTURE

(71) Applicant: TOYOTA JIDOSHA KABUSHIKI KAISHA, Toyota (JP)

(72) Inventors: Akihiro Yamada, Okazaki (JP); Kenshi Tomiki, Ichinomiya (JP); Yusuke Fujii, Toyota (JP); Satoshi Kasai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 429 days.

(21) Appl. No.: 16/260,171

(22) Filed: Jan. 29, 2019

(65) Prior Publication Data

US 2019/0232895 A1 Aug. 1, 2019

(30) Foreign Application Priority Data

Jan. 30, 2018 (JP) .............................. JP2018-013333

(51) Int. Cl.
| | |
|---|---|
| *B60R 16/02* | (2006.01) |
| *B60L 3/00* | (2019.01) |
| *B60K 1/00* | (2006.01) |
| *B62D 25/08* | (2006.01) |
| *H01M 50/20* | (2021.01) |
| *B60L 50/60* | (2019.01) |
| *B60K 1/04* | (2019.01) |
| *B62D 21/15* | (2006.01) |

(52) U.S. Cl.
CPC ............ *B60R 16/0215* (2013.01); *B60K 1/00* (2013.01); *B60L 3/0007* (2013.01); *B62D 25/08* (2013.01); *B60K 1/04* (2013.01); *B60K 2001/0411* (2013.01); *B60K 2001/0438* (2013.01); *B60L 50/66* (2019.02); *B60Y 2304/01* (2013.01); *B60Y 2306/01* (2013.01); *B62D 21/152* (2013.01); *H01M 50/20* (2021.01)

(58) Field of Classification Search
CPC .................. B60R 16/0215; B60K 1/00; B60K 2001/0438; B60K 1/04; B60K 2001/0411; B62D 25/08; B62D 21/152; B60L 3/0007; B60L 50/66; B60Y 2306/01; B60Y 2304/01; H01M 50/20
See application file for complete search history.

(56) References Cited

U.S. PATENT DOCUMENTS

2015/0217707 A1   8/2015   Tanigaki et al.

FOREIGN PATENT DOCUMENTS

WO   WO 2014/034377 A1   3/2014

*Primary Examiner* — D Glenn Dayoan
*Assistant Examiner* — Melissa Ann Bonifazi
(74) *Attorney, Agent, or Firm* — Oblon, McClelland, Maier & Neustadt, L.L.P.

(57) ABSTRACT

A pair of floor-side extensions are provided in the vehicle width direction on the lower surface of at least one of a dash lower panel and a floor panel constituting the floor of a vehicle chamber so as to protrude downward in front of the battery unit front surface with a high voltage cable interposed between the pair of floor-side extension members. A pair of member-side extensions are provided so as to protrude upward at positions facing the pair of floor-side extensions in the vehicle front-and-rear direction on the rear end edge of a suspension member.

5 Claims, 9 Drawing Sheets

VEHICLE FRONT-PART STRUCTURE

CROSS REFERENCE TO RELATED APPLICATION

This application claims priority to Japanese Patent Application No. 2018-013333 filed on Jan. 30, 2018, which is incorporated herein by reference in its entirety including the specification, claims, drawings, and abstract.

TECHNICAL FIELD

The present disclosure relates to a vehicle front-part structure.

BACKGROUND

An electric car or the like which uses a rotating electric machine as a driving source is equipped with a battery unit. For example, in WO 2014/034377, a battery unit is mounted under the floor of the vehicle chamber (underfloor).

In a circuit, an electric power conversion unit including a DC/DC converter for performing voltage step-up/step-down operation and an inverter for performing AC/DC conversion is provided between the rotating electric machine and the battery unit. When the rotating electric machine and the electric power conversion unit are mounted in an engine compartment on the vehicle front side, a high voltage cable is drawn out of the rear surface of the electric power conversion unit. This high voltage cable extends rearward and downward and is connected to the front surface of the battery unit which is located under the floor. That is, the high voltage cable is placed in an S shape in a side view where the right side is assumed to be the vehicle front.

In addition, front wheels are arranged on respective sides of the engine compartment, and a suspension member which is a skeleton member for suspending the front wheels is provided under the engine compartment. When the battery unit is mounted under the floor, the suspension member is positioned in front of the battery unit.

SUMMARY

At the time of a vehicle frontal collision (hereinafter referred to as "frontal collision," if appropriate), the suspension member is pushed by an obstacle and retreated. At this time, the high voltage cable is caught between the suspension member and the battery unit, which may cause damage to the cable. Accordingly, an object of the present disclosure is to provide a vehicle front-part structure in which the high voltage cable can be prevented from being caught between the suspension member and the battery unit at the time of a frontal collision.

The present disclosure relates to a vehicle front-part structure. The vehicle front-part structure includes a battery unit, an electric power conversion unit, a suspension member, and a high voltage cable. The battery unit is provided under the floor of a vehicle chamber. The electric power conversion unit is provided in an engine compartment in front of the vehicle chamber. The suspension member is provided under the electric power conversion unit and in front of the battery unit. The high voltage cable extends upward and forward from the front surface of the battery unit and is connected to the electric power conversion unit. A pair of floor-side extension members are arranged in the vehicle width direction on the lower surface of at least one of a dash lower panel and a floor panel constituting the floor of the vehicle chamber so as to protrude downward in front of the front surface of the battery unit with the high voltage cable interposed between the pair of floor-side extension members. A pair of member-side extension members are arranged so as to protrude upward at positions facing the pair of floor-side extension members in the vehicle front-and-rear direction on the rear end edge of the suspension member.

According to the above structure, when the suspension member is retracted at the time of a frontal collision, the member-side extension members and the floor-side extension members collide with each other before the rear surface of the suspension member collides with the front surface of the battery unit. Thus, a gap is formed between the rear surface of the suspension member and the front surface of the battery unit to thereby prevent catching of the high voltage cable between them.

Further, in the above disclosure, opposing surfaces of the pair of floor-side extension members and the pair of member-side extension members that face each other in the vehicle front-and-rear direction may be inclined surfaces inclined downward toward the vehicle rear.

According to the above structure, after the floor-side extension members and the member-side extension members collide with each other, the suspension member penetrates downward and rearward (diagonally downward) along the inclination of the opposing surfaces. Thus, it becomes possible to prevent entry of the suspension member into the vehicle chamber.

Further, in the above disclosure, the opposing surfaces of the pair of member-side extension members may be inclined to be more horizontal than the opposing surfaces of the pair of floor-side extension members.

Due to the support structure of the suspension member, at the time of a frontal collision, the suspension member is sometimes retracted such that rear end of the suspension member is inclined downward; that is, such that the opposing surfaces of the member-side extension members are raised. Accordingly, by laying the opposing surfaces of the member-side extension members to be more horizontal than the opposing surfaces of the floor-side extension members in advance, it becomes possible to make the opposing surfaces of the member-side extension members and the opposing surfaces of the floor-side extension members in parallel with each other when the suspension member is retracted.

Further, in the above disclosure, the pair of floor-side extension members may be provided under a portion of at least one of a dash lower panel and a floor panel where a reinforcing member is provided on its upper surface.

Although, when the member-side extension members collide with the floor-side extension members at the time of a frontal collision, mounting positions for the floor-side extension members on at least one of the dash lower panel and the floor panel may project to the inside of the vehicle chamber, it becomes possible to prevent such projection and prevent reduction in the vehicle chamber space, by arranging the mounting positions under the portion of at least one of the dash lower panel and the floor panel where the reinforcing member is provided on its upper surface.

Further, the vehicle front-part structure according to another aspect of the present disclosure includes a battery unit, an electric power conversion unit, a suspension member, and a high voltage cable. The battery unit is provided under the floor of the vehicle chamber. The electric power conversion unit is provided in an engine compartment in front of the vehicle chamber. The suspension member is provided under the electric power conversion unit and in front of the battery unit. The high voltage cable extends upward and forward from the front surface of the battery unit and is connected to the electric power conversion unit. There is provided a floor-side extension member having a pair of floor-side protruding portions that are arranged in the vehicle width direction on the lower surface of at least one of a dash lower panel and a floor panel constituting the floor of the vehicle chamber so as to protrude downward in front of the front surface of the battery unit with the high voltage cable interposed between the pair of floor-side protruding portions. There is provided a member-side extension member having a pair of member-side protruding portions that protrude upward at positions facing the pair of floor-side protruding portions in the vehicle front-and-rear direction on the rear end edge of the suspension member.

According to the present disclosure, it becomes possible to prevent catching of the high voltage cable between the suspension member and the battery unit at the time of a frontal collision.

BRIEF DESCRIPTION OF DRAWINGS

Embodiments of the present disclosure will be described by reference to the following figures, wherein.

DESCRIPTION OF EMBODIMENTS

Figure 1:
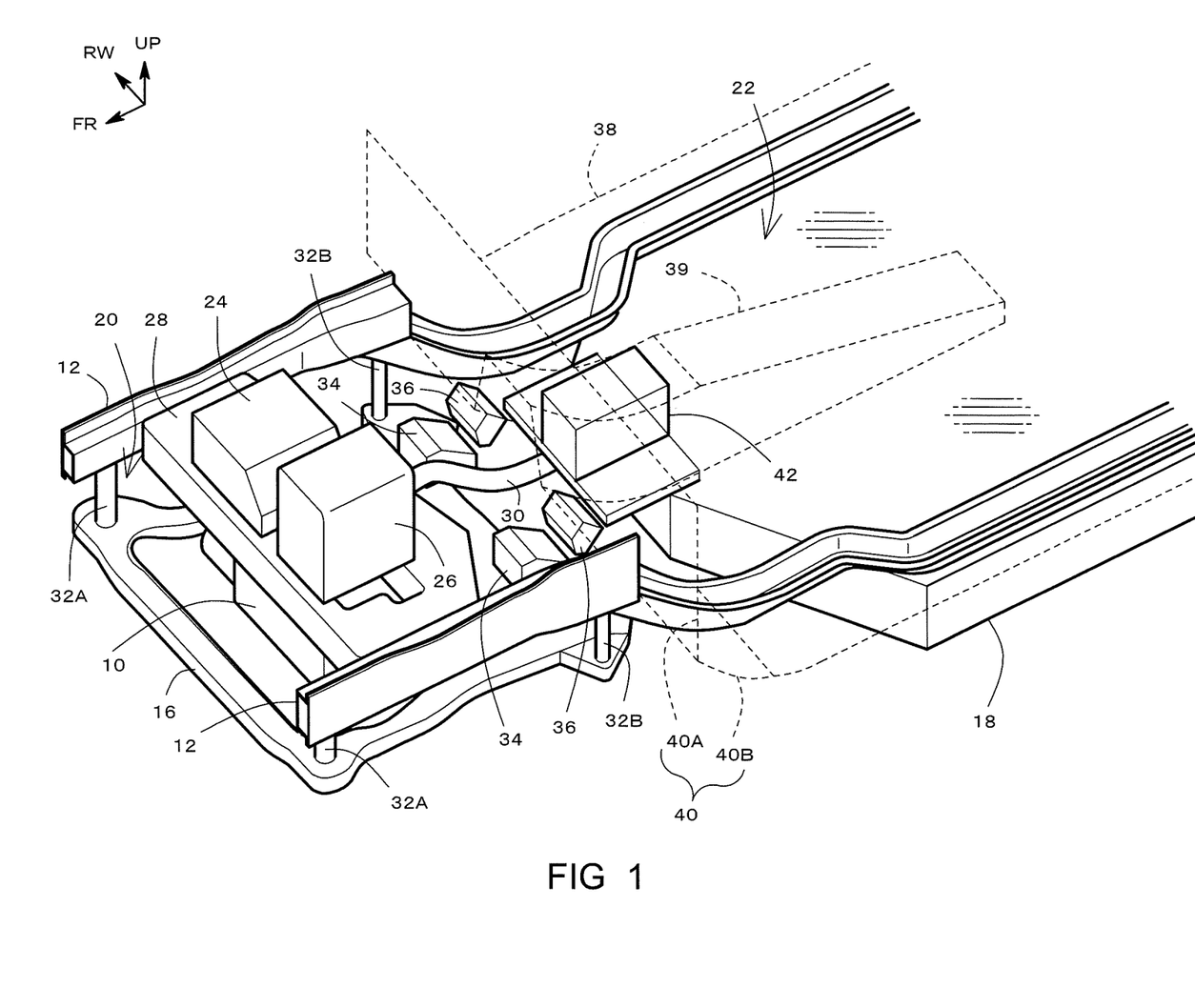
FIG. 1 is a perspective view illustrating a vehicle front-part structure according to the present embodiment.
Figure 2:
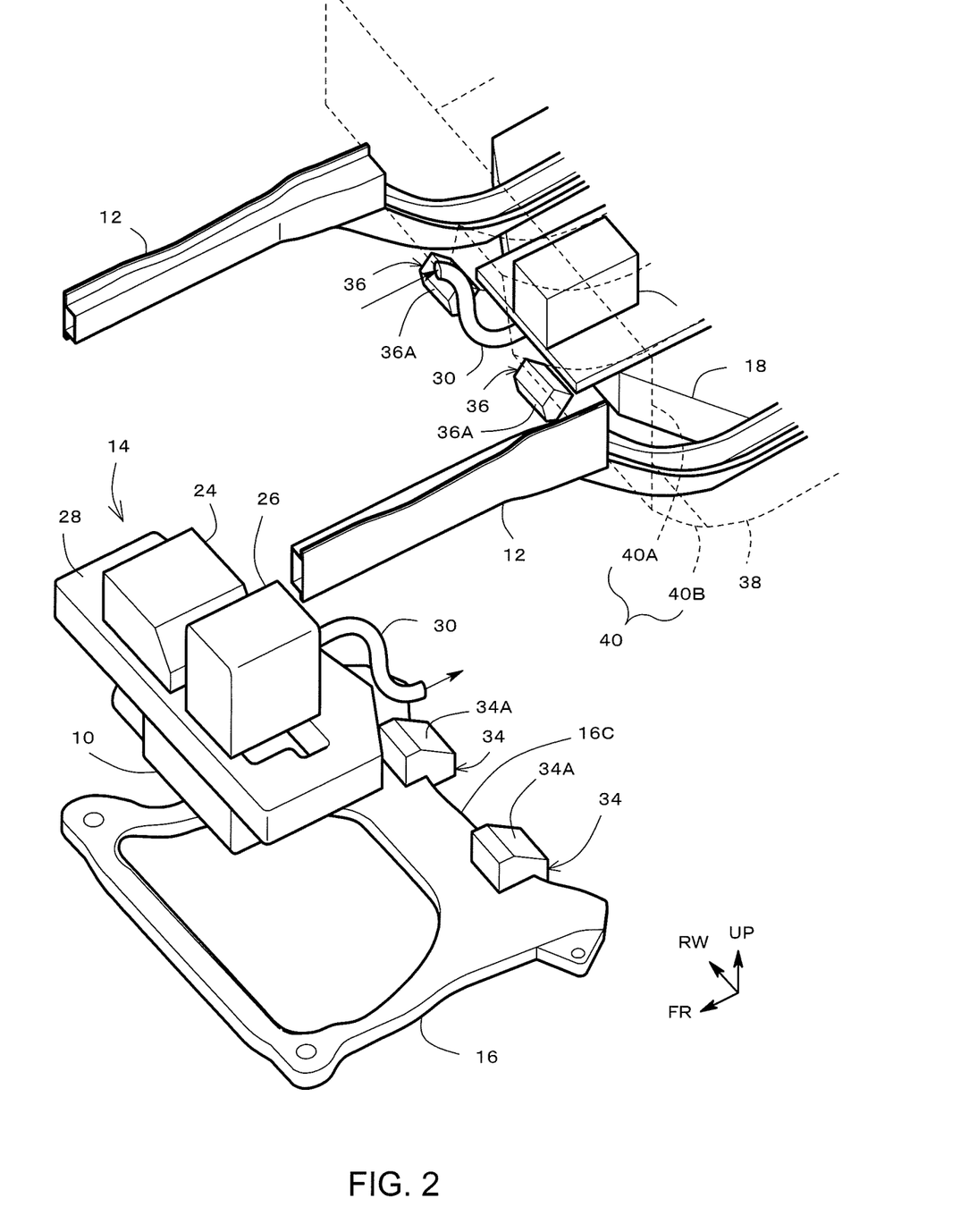
FIG. 2 is an exploded perspective view illustrating the vehicle front-part structure according to the present embodiment.

FIG. 1 illustrates a perspective view of a vehicle front-part structure according to the present embodiment, and FIG. 2 illustrates an exploded perspective view of the vehicle front-part structure.

In FIG. 1 to FIG. 8, the axis indicated by the sign FR represents the vehicle front-and-rear direction, and the axis indicated by the sign RW represents the width direction (vehicle width direction). The axis indicated by the sign UP represents the vertical direction. The sign FR is an abbreviation of "front," and regarding the front-and-rear direction axis FR, the vehicle front is assumed to be the positive direction. The sign RW is an abbreviation of "right width," and regarding the width direction axis RW, the right width direction is assumed to be the positive direction. In addition, regarding the height axis UP, the up direction is assumed to be the positive direction.

As shown in FIG. 1, these FR axis, RW axis, and UP axis are orthogonal to one another. Hereinafter, the vehicle front-part of the vehicle according to the present embodiment will be described using these three axes as a reference if necessary. For example, a "front end" means an end portion of any member which is located on the positive direction side of the FR axis, and a "rear end" means an end portion of any member which is located on the negative direction side of the FR axis. The "width inner side" means the relatively inner side in the vehicle width direction along the RW axis, and the "width outer side" means the relatively outer side in the vehicle width direction along the RW axis. In addition, unless otherwise specifically noted, the "width direction" means the vehicle width direction. Further, the "upper side" means the relatively positive direction side of the UP axis, and the "lower side" means the relatively negative direction side of the UP axis.

The vehicle front-part structure shown in FIG. 1 and FIG. 2 is installed in an electric car which uses a rotating electric machine 10 as a driving source. The vehicle front-part structure includes front side members 12, 12, a power electrical system assembly 14, a suspension member 16, and a battery unit 18.

The front side members 12, 12 are a pair of skeleton members arranged on respective sides in the vehicle width direction (right and left), and each member extends rearward from the front end of the vehicle. For example, the front side members 12, 12 extend from an engine compartment 20 on the vehicle front side to a front portion of a vehicle chamber 22 (cabin) behind the engine compartment 20.

The power electrical system assembly 14 and the suspension member 16 are mounted in the engine compartment 20. The power electrical system assembly 14 is an assembly in which a plurality of high voltage apparatuses are assembled together. The power electrical system assembly 14 is formed by assembling the rotating electric machine 10, a charger 24, and an electric power conversion unit 26 to a compartment cross member 28.

The rotating electric machine 10 is a driving source of the vehicle and is assembled on the lower side of the compartment cross member 28, for example. The rotating electric machine 10 is composed of a permanent magnet synchronous motor, for example.

The charger 24 and the electric power conversion unit 26 are assembled to the upper side of the compartment cross member 28. The charger 24 is connected to, for example, a charging connector (not shown) and can be charged from, for example, a charging station outside the vehicle.

The electric power conversion unit 26 is connected between the rotating electric machine 10 and the battery unit 18 and performs electric power conversion. The electric power conversion unit 26 is formed to include, for example, an inverter for performing AC/DC power conversion and a DC/DC converter for performing voltage step-up/step-down operation. The electric power conversion unit 26 houses the inverter and the DC/DC converter in a cuboid case, for example. Further, the rear surface of the case is connected to a high voltage cable 30 which is connected to the battery unit 18. The bottom surface of the case is also connected to the high voltage cable 30 (not shown) which is connected to the rotating electric machine 10.

The compartment cross member 28 is a skeleton member fixed to the pair of right and left front side members 12, 12. The compartment cross member 28 is, for example, a frame member having a generally rectangular shape and has an opening formed in the center thereof so as to vertically penetrate through the compartment cross member 28. The high voltage cable (not shown) connecting the rotating electric machine 10 and the electric power conversion unit 26 is placed through this opening.

The rotating electric machine 10, the charger 24, and the electric power conversion unit 26 are assembled to the compartment cross member 28 to form the power electrical system assembly 14. In the assembling step of the vehicle, the power electrical system assembly 14 is lifted up from below. Then, after the vertical positions of the compartment cross member 28 and the front side members 12, 12 are aligned, the compartment cross member 28 is fastened to the front side members 12, 12 using brackets (not shown). As a result of such assembling, the electric power conversion unit 26 is positioned above the front side members 12, as illustrated in FIG. 1.

The suspension member 16 is positioned under the power electrical system assembly 14 including the electric power conversion unit 26. In addition, as shown in FIG. 1, the suspension member 16 is provided in front of the battery unit 18. Namely, the suspension member 16 is positioned so as to be aligned with the battery unit 18 in height (vertical direction).

The suspension member 16 is a skeleton member for suspending the front wheels (not shown). The suspension member 16 has the shape of approximate parallel crosses, and both width direction sides of the front end portion and both width direction sides of the rear end portion are shaped to project outside in the width direction. Supporting members 32A and 32B are fastened to both width direction sides of the front end portion and both width direction sides of the rear end portion, respectively. The supporting members 32A and 32B are also fastened to the bottom surface of the front side members 12, 12. Namely, the suspension member 16 is hung and supported by the front side members 12 via the supporting members 32A and 32B.

Figure 4:
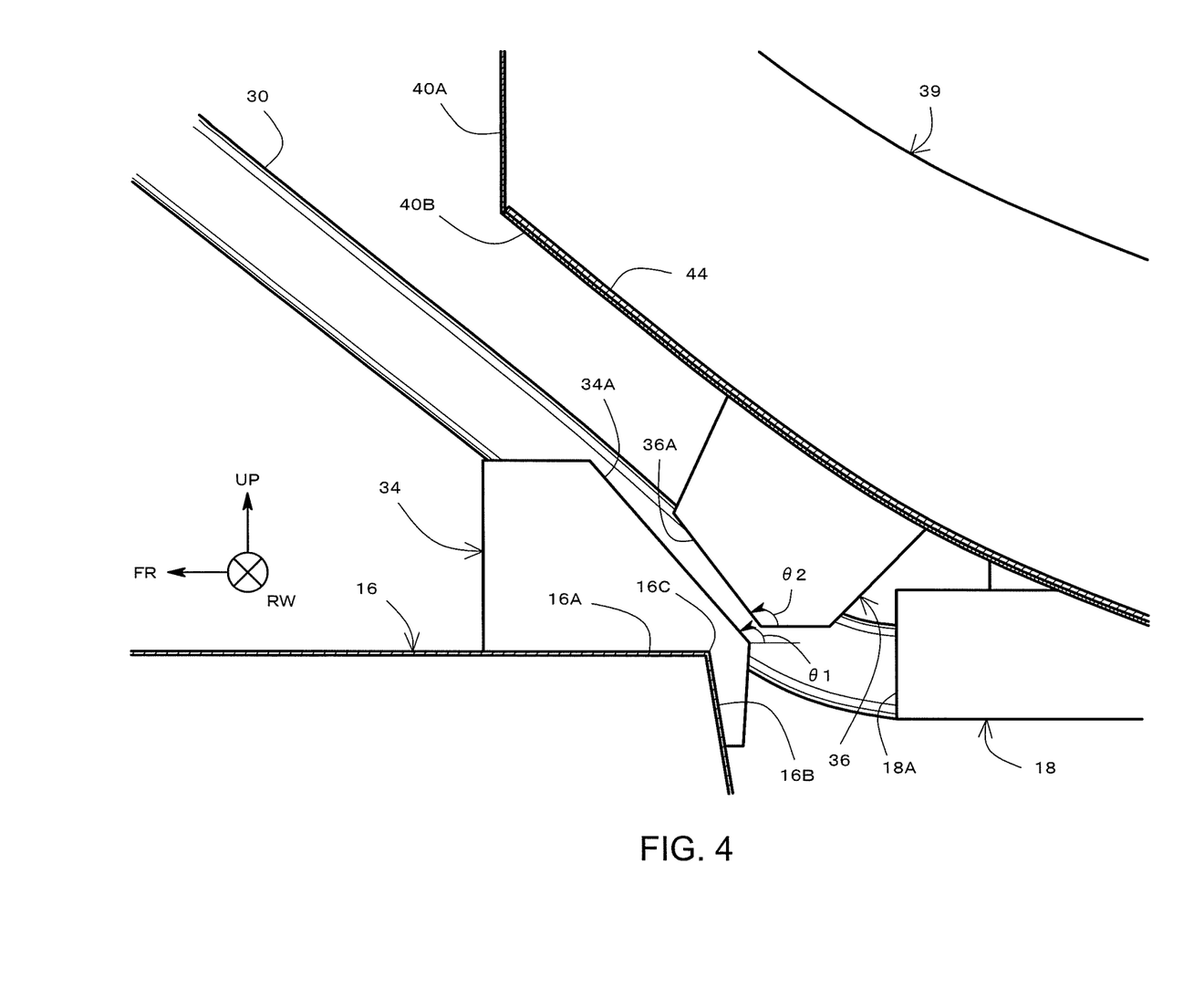
FIG. 4 is a cross-sectional side view taken along line A-A in FIG. 3.

Further, a pair of member-side extensions 34, 34 (member-side extension members) are provided on the rear end of the suspension member 16. As illustrated in FIG. 4, the member-side extension 34 is attached from an upper surface rear end 16A to a rear surface upper end 16B of the suspension member 16 and is fastened so as to be hooked on the rear end of the suspension member 16.

For example, the member-side extension 34 is a generally box-shaped rigid member made of a metallic material such as aluminum, and an opening in the box-shaped member is covered with the upper surface rear end 16A and the rear surface upper end 16B of the suspension member 16 to form a closed cross-section structure.

The member-side extension 34 may be fastened to the suspension member 16 using a fastening member, such as nuts and bolts, or may be joined to the suspension member 16 by welding, for example. In addition, the member-side extension 34 may be formed as a portion of the suspension member 16 by processing the rear end of the suspension member 16 to protrude upward.

The member-side extension 34 protrudes upward from the upper surface of the suspension member 16. Further, as shown in FIG. 1, the member-side extensions 34, 34 are arranged at positions facing floor-side extensions 36, 36 in the vehicle front-and-rear direction on a rear end edge 16C of the suspension member 16. Referring to FIG. 4, the rear end edge 16C of the suspension member 16 is a ridge which defines the border between the upper surface rear end 16A and the rear surface upper end 16B of the suspension member 16, and the member-side extensions 34, 34 are arranged on the ridge. Further, referring to FIG. 3, the member-side extensions 34, 34 are provided along the vehicle width direction with the high voltage cable 30 interposed therebetween.

Referring to FIG. 4, opposing surfaces 34A facing the floor-side extensions 36 in the vehicle front-and-rear direction are formed on the member-side extensions 34. The opposing surfaces 34A are inclined surfaces that are inclined downward toward the vehicle rear. As described below, by adopting an inclined surface as the opposing surfaces 34A, it becomes possible to drop the suspension member 16 to the lower side of the vehicle at the time of a frontal collision.

In addition, an angle of inclination $\theta 1$ of the opposing surfaces 34A of the member-side extensions 34 with respect to the horizontal surface is formed to be smaller than an angle of inclination $\theta 2$ of the opposing surfaces 36A of the floor-side extensions 36 with respect to the horizontal surface. In other words, the opposing surfaces 34A of the member-side extensions 34 are inclined to be more horizontal than the opposing surfaces 36A of the floor-side extensions 36A.

As such, by forming the opposing surfaces 34A of the member-side extensions 34 to be laid more horizontal than the opposing surfaces 36A of the floor-side extensions 36A, the opposing surfaces 36A of the floor-side extensions 36 and the opposing surfaces 34A of the member-side extensions 34 are aligned in parallel in a side view when the rear end of the suspension member 16 is inclined downward and the opposing surfaces 34A of the member-side extensions 34 are raised at the time of a frontal collision as described below.

Referring to FIG. 1, the vehicle chamber 22 is partitioned by a floor panel 38 and a dash panel 40. The dash panel 40 includes a dash upper panel 40A which is an upper panel and a dash lower panel 40B which is a lower panel.

The dash upper panel 40A stands approximately vertically. The upper end of the dash lower panel 40B is connected to the lower end of the dash upper panel 40A and further extends therefrom in a curved form in a side view. The dash lower panel 40B is bent from a vertical form into an arc or inclined form, and its rear end then becomes approximately horizontal and is connected to the front end of the floor panel 38.

The dash lower panel 40B functions as a so-called toe board on which the feet of a passenger on the front seat rest. Because of such a function, the floor plate of the vehicle chamber 22 is composed of the dash lower panel 40B and the floor panel 28.

A floor tunnel 39 is formed in the center in the width direction of the dash lower panel 40B and the floor panel 38. If an internal combustion engine is installed in the vehicle, an exhaust pipe runs through this floor tunnel 39. Meanwhile, for an electric car in which no internal combustion engine is installed, the exhaust pipe is unnecessary, and therefore, for example, a battery ECU 42 for monitoring or controlling a battery is positioned in the floor tunnel 39.

Figure 3:
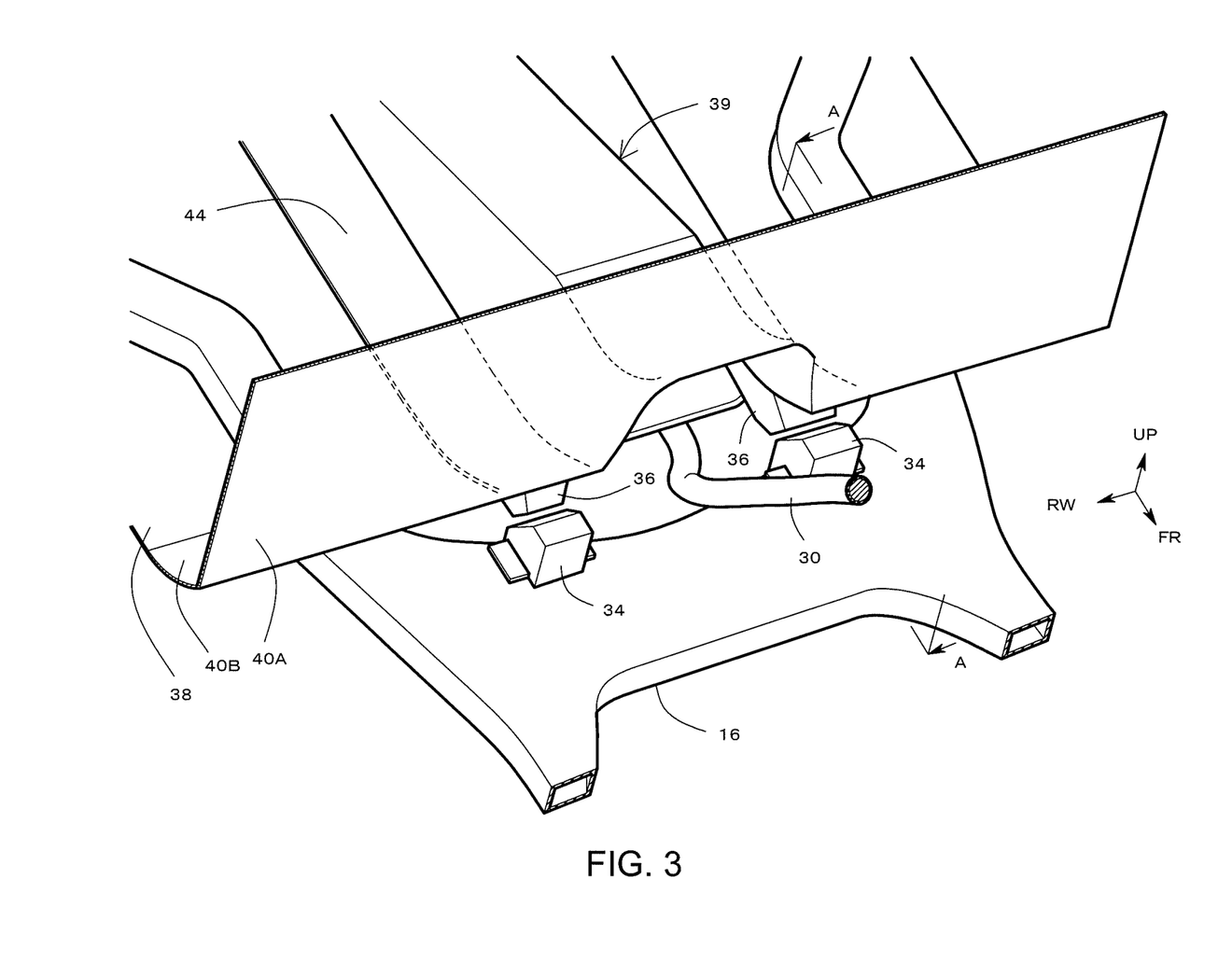
FIG. 3 is a perspective view illustrating a rear portion of the vehicle front-part structure according to the present embodiment.

Further, referring to FIG. 3, the floor tunnel 39 is reinforced by a reinforcing member called a tunnel reinforcer 44. The tunnel reinforcer 44 covers the floor tunnel 39 and extends in the width direction to the floor plate regions on both sides of the floor tunnel 39 (the upper surfaces of the dash lower panel 40B and the floor panel 38). As shown in FIG. 3, the floor-side extensions 36, 36 are arranged under these extending portions. Namely, the floor-side extensions 36, 36 are arranged under a portion of at least one of the dash lower panel 40B and the floor panel 38 constituting the floor plate where the reinforcing member (tunnel reinforcer 44) is provided on its upper surface.

Returning to FIG. 1, the battery unit 18 is positioned under the floor of the vehicle chamber; that is, under the floor panel 38. A plurality of battery cells (electric cells) are mounted in the battery unit 18. For example, the battery cell is composed of a lithium-ion secondary battery, nickel-hydrogen secondary battery, or all-solid battery. For example, a plurality of battery cells are connected in parallel to form a battery group, and a plurality of battery groups are further connected in series.

The high voltage cable 30 is connected to the width direction center of a front surface 18A of the battery unit 18 (see FIG. 4). The high voltage cable 30 extends upward and forward from the front surface 18A of the battery unit 18 and is connected to the electric power conversion unit 26 of the power electrical system assembly 14. For example, as illustrated in FIG. 1, the high voltage cable 30 is placed in an inverted S shape in a side view where the left side is assumed to be the vehicle front.

The pair of floor-side extensions 36, 36 (floor-side extension members) are provided on the lower surface of the dash lower panel 40B, which is a portion of the floor plate constituting the floor of the vehicle chamber 22. The floor-side extensions 36, 36 are provided in front of the front surface 18A of the battery unit 18. For example, as shown in FIG. 4, the floor-side extensions 36 are provided on the lower surface of the dash lower panel 40B such that at least the opposing surfaces 36A facing the member-side extensions 34 are in front of the front surface 18A of the battery unit 18.

Although, in the example in FIG. 1, the floor-side extensions 36, 36 are provided on the lower surface of the dash lower panel 40B, the present embodiment is not limited to this form. In short, the floor-side extensions 36, 36 only need to be provided on the lower surface of the floor of the vehicle chamber 22 so as to be in front of the front surface 18A of the battery unit 18. Specifically, the floor-side extensions 36, 36 only need to be provided on the lower surface of at least one of the dash lower panel 40B and the floor panel 38 constituting the floor of the vehicle chamber 22 so as to be in front of the front surface 18A of the battery unit 18. For example, the floor-side extensions 36, 36 may be provided on the lower surface of the floor panel 38 or may be provided across the lower surfaces of both the dash lower panel 40B and the floor panel 38.

The floor-side extensions 36 protrude downward from the lower surface of the dash lower panel 40B such that the opposing surfaces 36A face the opposing surfaces 34A of the member-side extensions 34 in the vehicle front-and-rear direction. For example, the member-side extensions 36, 36 are generally box-shaped rigid members made of a metallic material such as aluminum, and an opening in the box-shaped member is covered with the dash lower panel 40B to form a closed cross-section structure.

Referring FIG. 4, the opposing surfaces 36A of the floor-side extensions 36 are inclined surfaces that arc inclined downward toward the vehicle rear. As described below, these inclined surfaces function as sliding surfaces for dropping the suspension member 16 to the lower side at the time of a frontal collision. In order to ensure that the suspension member 16 is dropped, an angle of inclination θ2 of the opposing surfaces 36A with respect to the horizontal surface may be close to vertical, such as, for example, greater than 90 degrees and smaller than 135 degrees (90 degrees<θ2<135 degrees).

In addition, as described above, the angle of inclination θ2 of the opposing surfaces 36A of the floor-side extensions 36 with respect to the horizontal surface is fainted to be greater than the angle of inclination θ1 of the opposing surfaces 34A of the member-side extensions 34 with respect to the horizontal surface.

Referring to FIG. 3, the floor-side extensions 36, 36 are provided on the lower surface of the dash lower panel 40B along the vehicle width direction with the high voltage cable 30 interposed therebetween. For example, the floor-side extensions 36, 36 are provided at the border portion with the floor tunnel 39 on the floor surface of the vehicle chamber 22.

<Behavior at the Time of a Frontal Collision>

Figure 5:
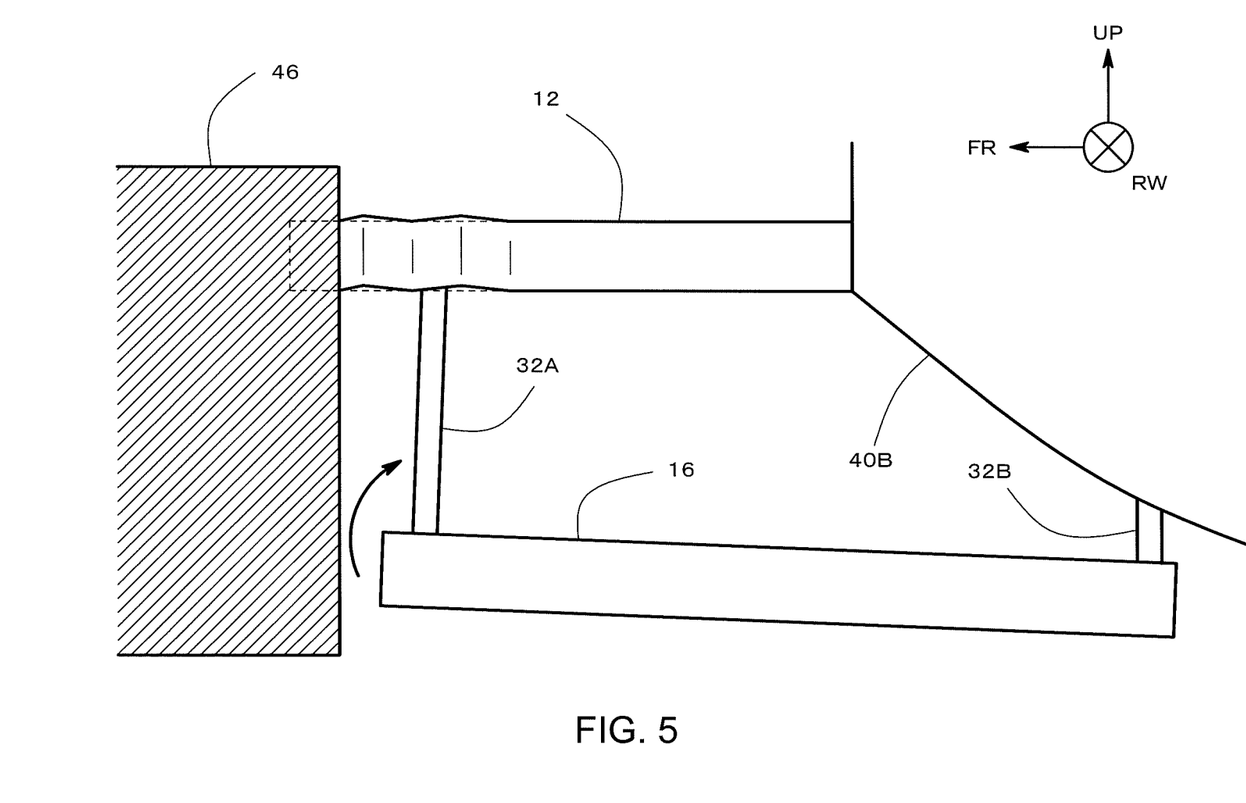
FIG. 5 is a side view explaining behaviors of a suspension member at the time of a frontal collision.

Behaviors of the vehicle front-part structure according to the present embodiment at the time of a frontal collision will be described with reference to FIG. 5 to FIG. 8. As illustrated in FIG. 5, when the vehicle front surface collides with an obstacle 46 (barrier), the front end of the front side member 12 receives the obstacle and is bent and deformed (buckled). As a result of this bending deformation, the supporting member 32A supporting the suspension member 16 on the front side member 12 is retracted. As a result, the front end of the suspension member 16 is lifted upward and the read end is inclined downward.

Figure 6:
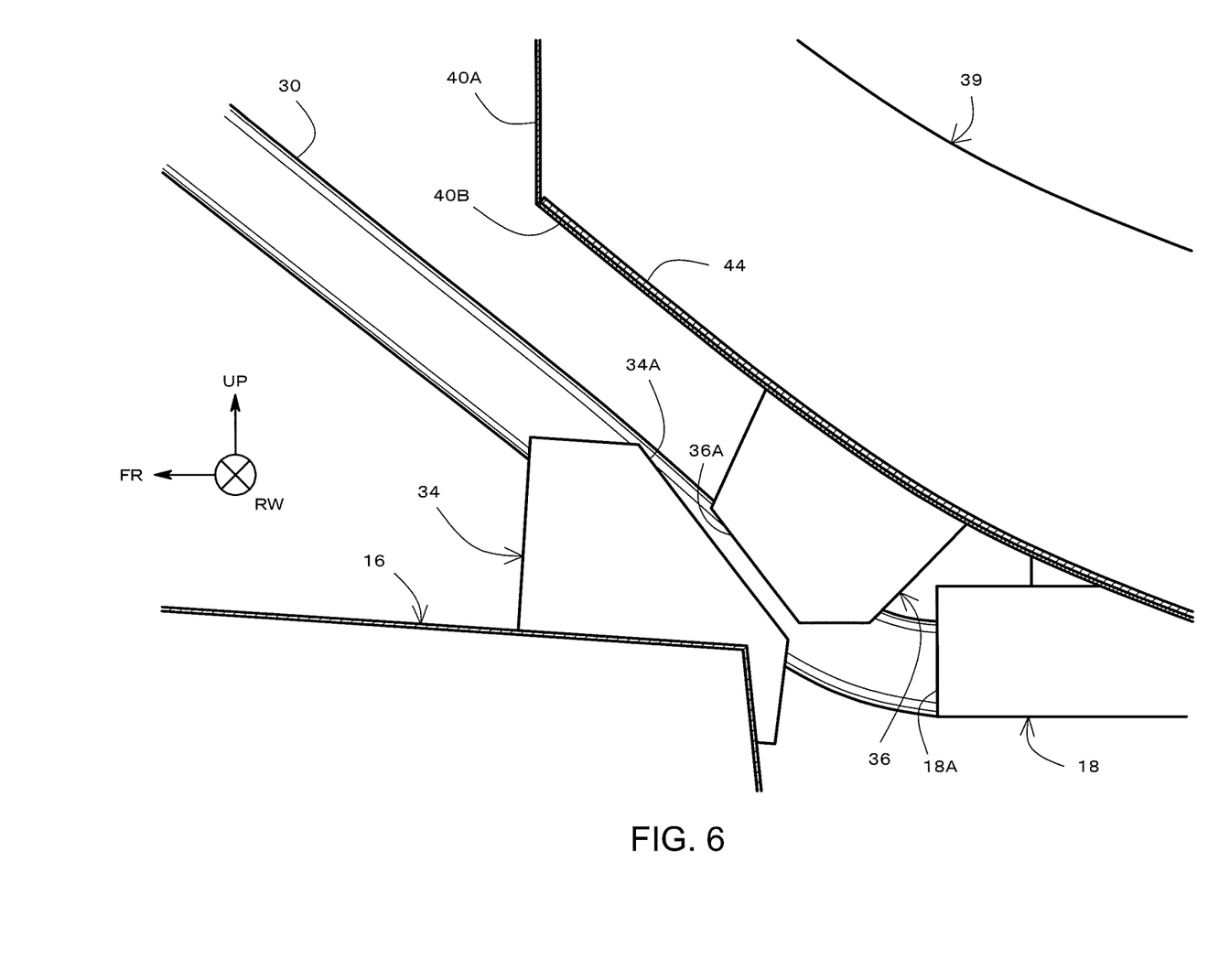
FIG. 6 is a side view (1/3) explaining circumstances around a member-side extension and a floor-side extension at the time of a frontal collision.
Figure 7:
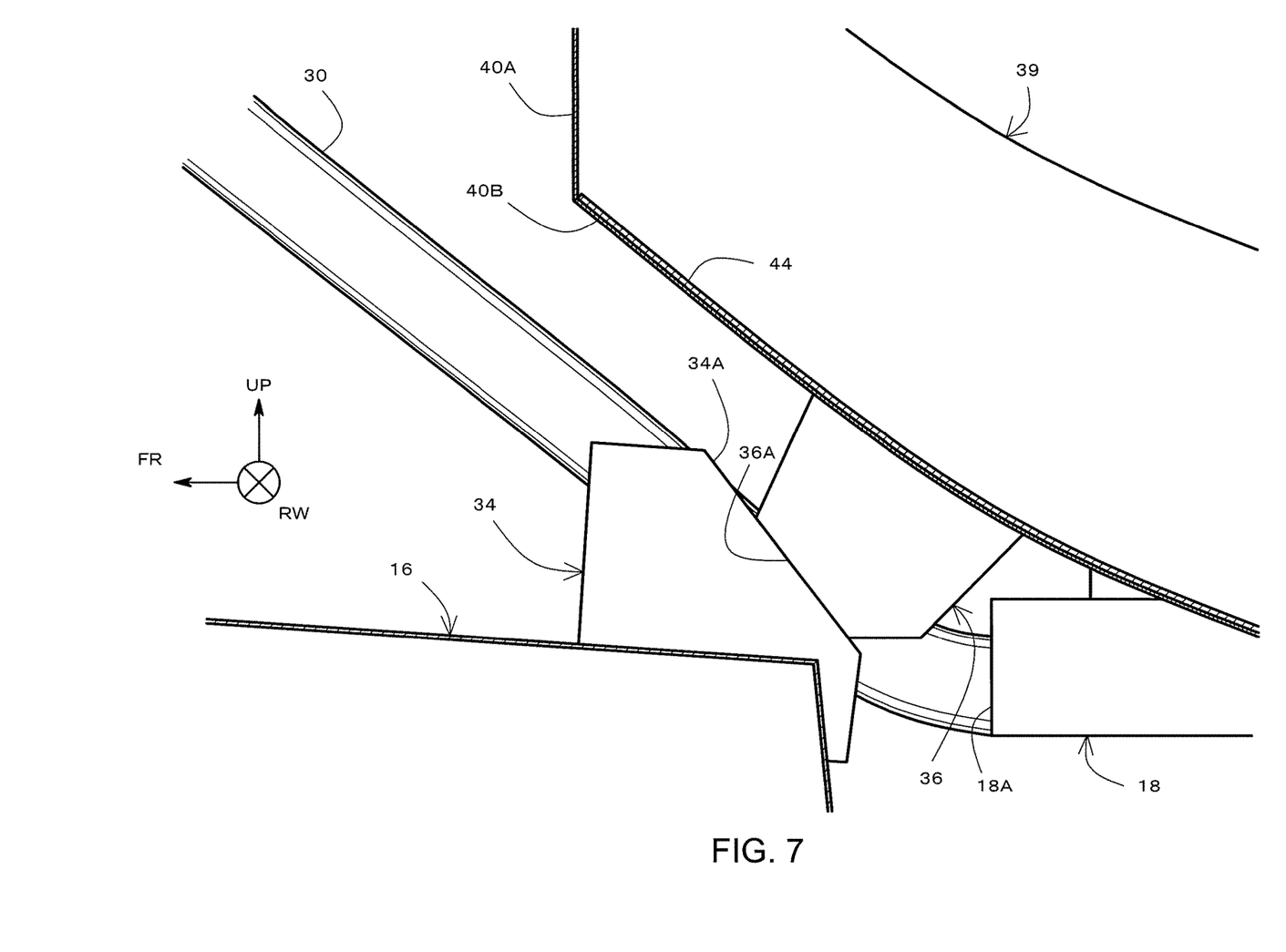
FIG. 7 is a side view (2/3) explaining circumstances around the member-side extension and the floor-side extension at the time of a frontal collision.

As the rear end of the suspension member 16 is inclined, as illustrated in FIG. 6, the opposing surfaces 34A of the member-side extensions 34 are raised, and the opposing surfaces 34A and the opposing surfaces 36A of the floor-side extensions 36 become in parallel with each other in a side view. The suspension member 16 is further retracted while keeping this parallel state, and as illustrated in FIG. 7, the opposing surfaces 34A of the member-side extensions 34 collide with the opposing surfaces 36A of the floor-side extensions 36.

At the time of this collision, the load which is large enough to sink the floor-side extensions 36 into the vehicle chamber is input to the floor-side extensions 36, which received the collision of the member-side extensions 34. Here, as described above, the floor-side extensions 36 are provided under the tunnel reinforcer 44, which is a reinforcing member. In other words, the floor-side extensions 36 are lined with the tunnel reinforcer 44. Therefore, the load of the floor-side extensions 36 applied to the inside of the vehicle chamber 22 is received by the tunnel reinforcer 44, thereby preventing entry of the floor-side extensions 36 into the vehicle chamber 22.

Figure 8:
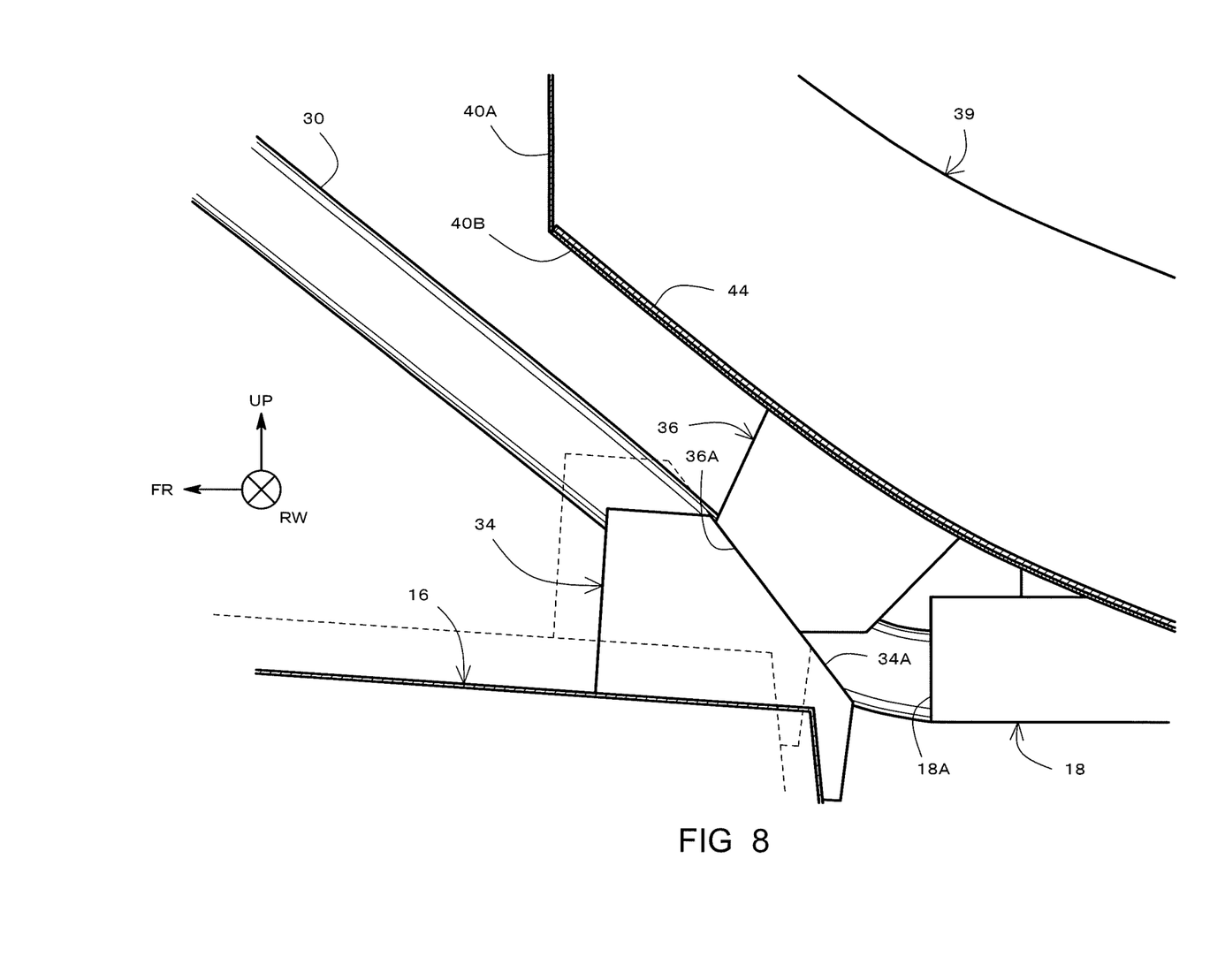
FIG. 8 is a side view (3/3) explaining circumstances around the member-side extension and the floor-side extension at the time of a frontal collision.

As the frontal collision further progresses, the opposing surfaces 34A of the member-side extensions 34 and the opposing surfaces 36A of the floor-side extensions 36, which are inclined surfaces, guide the suspension member 16 downward, as illustrated in FIG. 8. Namely, the member-side extensions 34 slip downward and rearward with respect to the floor-side extensions 36, which causes the suspension member 16 to drop downward and rearward. Thus, it becomes possible to prevent entry of the suspension member 16 into the vehicle chamber 22.

<Another Aspect of the Present Embodiment>

Figure 9:
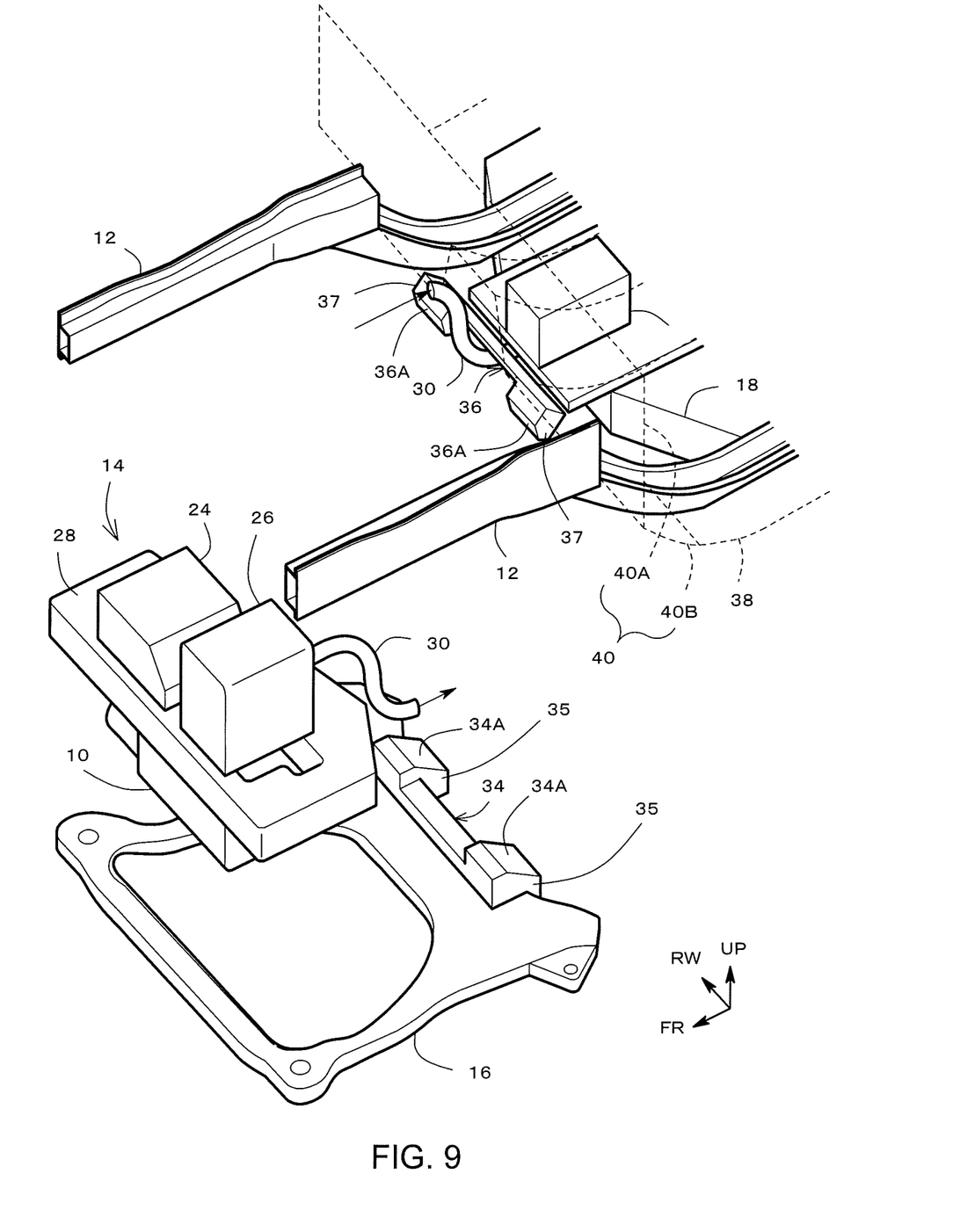
FIG. 9 is a perspective view illustrating a vehicle front-part structure according to another aspect of the present embodiment.

Although, in FIG. 1 to FIG. 8, each of the member-side extensions 34, 34 and the floor-side extensions 36, 36 is a single independent part, other forms may be adopted. For example, as illustrated in FIG. 9, each of the member-side extension 34 (member-side extension member) and the floor-side extension 36 (floor-side extension member) may be a single part.

The floor-side extension 36 is provided on the lower surface of at least one of the dash lower panel 40B and the floor panel 38 so as to be in front of the front surface 18A of the battery unit 18. The floor-side extension 36 has a pair of floor-side protruding portions 37, 37 that are arranged in the vehicle width direction with the high voltage cable 30 interposed therebetween and protrude downward. The structure of the opposing surfaces 36A of the floor-side protruding portions 37, 37 may be identical to that of the opposing surfaces 36A of the floor-side extensions 36, 36 shown in FIG. 4.

In addition, the member-side extension 34 is provided on the rear end edge 16C of the suspension member 16. The member-side extension 34 has a pair of member-side protruding portions 35, 35 that protrude upward at positions facing the pair of floor-side protruding portions 37, 37 in the vehicle front-and-rear direction on the rear end edge 16C of the suspension member 16. The structure of the opposing surfaces 34A of the member-side protruding portions 35, 35 may be identical to that of the opposing surfaces 34A of the member-side extensions 34, 34 shown in FIG. 4.

The present disclosure is not limited to the embodiments described above and includes all variations and modifications which do not depart from the technical scope and the essence of the present disclosure defined in the claims.

The invention claimed is:

1. A vehicle front-part structure comprising:
   a battery unit provided under a floor of a vehicle chamber;
   an electric power conversion unit provided in an engine compartment in front of the vehicle chamber;
   a suspension member provided under the electric power conversion unit and in front of the battery unit; and
   a high voltage cable that extends upward and forward from a front surface of the battery unit and is connected to the electric power conversion unit, wherein
   a pair of floor-side extension members are provided in the vehicle width direction on a lower surface of at least one of a dash lower panel and a floor panel constituting the floor of the vehicle chamber so as to protrude downward in front of the front surface of the battery unit with the high voltage cable interposed between the pair of floor-side extension members, and
   a pair of member-side extension members are provided so as to protrude upward at positions facing the pair of floor-side extension members in the vehicle front-and-rear direction on a rear end edge of the suspension member.

2. The vehicle front-part structure according to claim 1, wherein opposing surfaces of the pair of floor-side extension members and the pair of member-side extension members that face each other in the vehicle front-and-rear direction are inclined surfaces inclined downward toward the vehicle rear.

3. The vehicle front-part structure according to claim 2, wherein the opposing surfaces of the pair of member-side extension members are inclined to be more horizontal than the opposing surfaces of the pair of floor-side extension members.

4. The vehicle front-part structure according to claim 1, wherein the pair of floor-side extension members are provided under a portion of at least one of the dash lower panel and the floor panel, the portion having a reinforcing member on an upper surface of the portion.

5. A vehicle front-part structure comprising:
   a battery unit provided under a floor of a vehicle chamber;
   an electric power conversion unit provided in an engine compartment in front of the vehicle chamber;
   a suspension member provided under the electric power conversion unit and in front of the battery unit; and
   a high voltage cable that extends upward and forward from a front surface of the battery unit and is connected to the electric power conversion unit, wherein
   a floor-side extension member having a pair of floor-side protruding portions is provided, the pair of floor-side protruding portions being arranged in the vehicle width direction on a lower surface of at least one of a dash lower panel and a floor panel constituting the floor of the vehicle chamber, the pair of floor-side protruding portions protruding downward in front of the front surface of the battery unit with the high voltage cable interposed between the pair of floor-side protruding portions, and
   a member-side extension member having a pair of member-side protruding portions is provided, the pair of member-side protruding portions protruding upward at positions facing the pair of floor-side protruding portions in the vehicle front-and-rear direction on a rear end edge of the suspension member.

* * * * *